United States Patent [19]

Ishida

[11] Patent Number: 4,633,992
[45] Date of Patent: Jan. 6, 1987

[54] CLUTCH MECHANISM FOR AUTOMOBILE
[75] Inventor: Hisao Ishida, Tokyo, Japan
[73] Assignee: Isuzu Motors, Ltd., Japan
[21] Appl. No.: 674,092
[22] Filed: Nov. 23, 1984
[51] Int. Cl.⁴ .................... F16D 25/08; F16D 13/75
[52] U.S. Cl. ............................. 192/85 C; 192/91 R; 192/99 S; 192/110 R; 29/434
[58] Field of Search ............... 192/85 C, 91 R, 70.25, 192/99 S, 110 R, 111 R, 89 B; 74/99 R; 29/418, 434

[56] References Cited

U.S. PATENT DOCUMENTS

| 3,443,673 | 5/1969 | Rosenberger | 192/91 |
| 3,718,305 | 2/1973 | Suozzo | 248/54 CS |

FOREIGN PATENT DOCUMENTS

| 2637636 | 2/1978 | Fed. Rep. of Germany | 192/91 R |
| 339062 | 7/1959 | Switzerland | 192/91 R |
| 2022210 | 12/1979 | United Kingdom | 192/110 R |

Primary Examiner—Rodney H. Bonck
Assistant Examiner—David A. Testardi
Attorney, Agent, or Firm—John E. Toupal; Harold G. Jarcho

[57] ABSTRACT

A clutch assembly for automobiles and includes a clutch mechanism, a pivotally mounted operator coupled to the clutch mechanism and pivotable between positions that alternatively produce either engagement or disengagement thereof, a pivotally mounted actuator, and a hydraulic control comprising a piston coupled to the actuator and operable to produce pivotal movement thereof. Also included is an operator positioning means for establishing a predetermined position of the operator and adapted to permit pivotal movement thereof from said predetermined position, an actuator positioning means for establishing a given position thereof relative to the operator means and adapted to permit pivotal movement of the actuator positioning means from the given position, and a manually adjustable coupling operatively coupling the operator and the actuator.

6 Claims, 2 Drawing Figures 4,633,992

CLUTCH MECHANISM FOR AUTOMOBILE

BACKGROUND OF THE INVENTION

This invention relates generally to a clutch mechanism for automobiles and, more particularly, to a clutch mechanism provided with a hydraulic actuator.

To enhance economy and driving convenience, vehicles have been equipped with cooperating automatic clutch and transmission mechanisms. Electronically controlled, hydraulic actuators generally are used to provide timely activation of the clutch and transmission mechanisms. Typically, the clutch mechanism is coupled to a hydraulic actuator by a mechanical linkage. Adjustment of that linkage during assembly has been troublesome. Because positional movement of the clutch mechanism is critical, any play in the coupling linkage is undesirable. Accordingly, elimination of play by accurate positioning of the mechanical linkage relative to the clutch mechanism and its hydraulic actuator is a costly, time consuming operation.

The object of this invention, therefore, is to provide an improved linkage for coupling a clutch mechanism and a hydraulic actuator.

SUMMARY OF THE INVENTION

The invention is a clutch assembly for automobiles and includes a clutch mechanism, a pivotally mounted operator coupled to the clutch mechanism and pivotable between positions that alternatively produce either engagement or disengagement thereof, a pivotally mounted actuator, and a hydraulic contol comprising a piston coupled to the actuator and operable to produce pivotal movement thereof. Also included is an operator positioning means for establishing a predetermined position of the operator and adapted to permit pivotal movement thereof from said predetermined position, an actuator positioning means for establishing a given position thereof relative to the operator means and adapted to permit pivotal movement of the actuator positioning means from the given position, and a manually adjustable coupling operatively coupling the operator and the actuator. The manually adjustable coupling simplifies accurate positional assembly of the clutch.

According to one feature of the invention, the operator comprises an arm having one end pivotally mounted and an opposite end fixed to the coupling; and the actuator comprises a lever having one end pivotally mounted, an opposite end fixed to the coupling means, and an intermediate portion fixed to the piston; and the coupling comprises a linkage of manually adjustable length. This feature provides the desired positional adjustment in a simple mechanical arrangement.

According to other features of the invention, the predetermined position of the arm produces engagement of the clutch mechanism, the operator positioning means comprises bias means biasing the arm toward a clutch disengaging position, and the bias provided by the bias means is insufficient to move the arm to a clutch disengaging position. The bias means further simplifies assembly of the device.

According to still another feature of the invention, the actuator positioning means comprises a removable pin for fixing the lever in the given position. The pin establishes an initial position for the lever in an inexpensive manner.

DESCRIPTION OF THE PREFERRED EMBODIMENT

Figure 1:
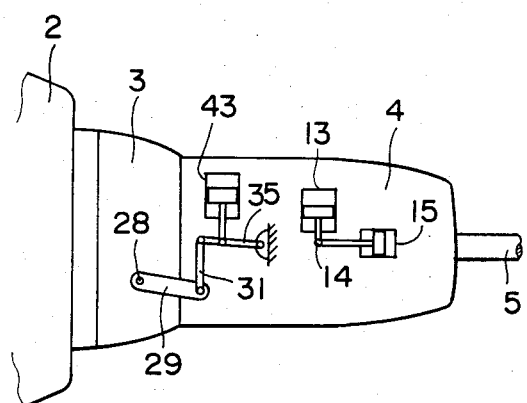
FIG. 1 is a schematic representation of a clutch operating assembly according to the present invention.

An automatic clutch mechanism and an automatic transmission having parallel input and output shafts is shown in FIG. 1. A hydraulic actuator 43 is connected to a clutch mechanism 3 and hydraulic actuators 13 and 15 are connected to a shift lever 14 of a gear transmission 4. The hydraulic actuators 13, 14 and 43 are automatically controlled by an electronic control unit (not shown) in the same manner as they would be manipulated by a driver. Fastened to a rotary shaft 28 of a conventional release lever on the clutch mechanism 3 is a clutch operator arm 29. A link 31 connects the clutch arm 29 to an actuator lever 35 pivotally secured on the casing of the transmission gears 4. The lever 35 is operatively coupled to the hydraulic actuator 43.

Figure 2:
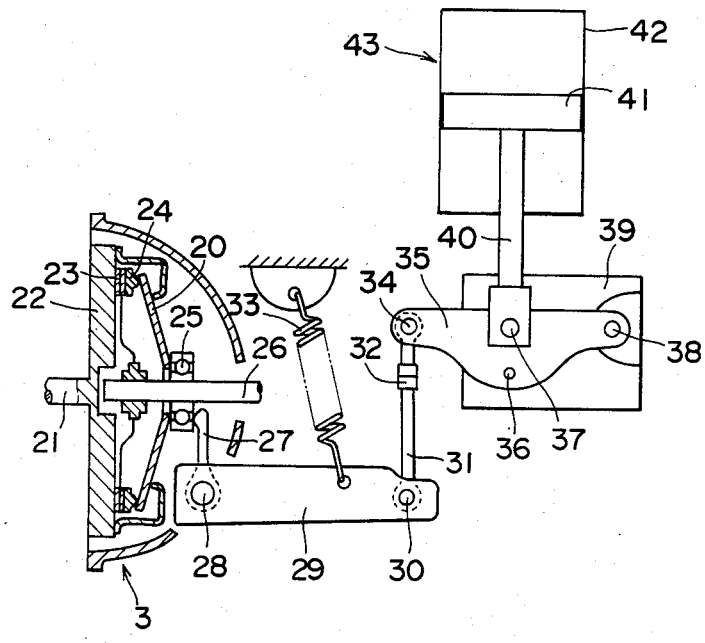
FIG. 2 is a detailed representation of the clutch operating assembly shown in FIG. 1.

Referring to FIG. 2, the conventional clutch mechanism 3 includes a friction plate 23 slidably mounted by a spline on an output shaft 26 which is an input shaft of the transmission 4. Aligned with the friction plate 23 is a pressure plate 24. A diaphragm spring 20 exerts a force producing engagement between the friction plate 23 and a flywheel 22 on the crank shaft 21 of the engine 2. However, engagement between the flywheel 22 and the friction plate 23 can be released by releasing the spring force applied by the spring 20 to the pressure plate 24. That action is provided by a release lever 27 fixed to a pivot 28 on a casing 39 of the clutch mechanism 3. When rotated counterclockwise in FIG. 2, the release lever 27 pushes a release bearing 25 leftwardly on the output shaft 26. That movement forces a central portion of the diaphragm spring 20 leftwardly while the peripheral portion is flexed rightwardly to release pressure on the pressure plate 24.

The operator clutch arm 29 is mounted on the rotary pivot 28 and a positioning spring 33 has one end fastened to an intermediate portion of the clutch arm 29 and an opposite end fastened to the base frame i.e. a casing 39 of the transmission 4. Also, an actuator lever 37 is pivotally secured by a pivot 38 on the casing 39 of the transmission 4. The intermediate portion of the lever 35 is connected by a pin 37 to a piston rod 40 of the hydraulic driver 43 which includes a cylinder 42 and a piston 41 slidably inserted into the cylinder 42 and fixed to the piston rod 40. Joined by pins 30, 34, respectively, to opposite ends of the arm 29 and the lever 35 is a coupling linkage 31 that includes a length adjusting turn buckle 32. According to the invention, an actuator positioning mechanism includes a pin 36 removably received in alignable apertures in an intermediate portion of the lever 35 and the casing 39.

OPERATION

When aligning the clutch assembly, relative positions of the operator arm 29 and the actuator lever 35 are first established while decoupled from the linkage 31 and with the hydraulic driver in a clutch engaged position. The pin 36 is temporarily inserted into the apertures provided in the intermediate portion of the lever 35 and the transmission casing 39 to establish a given initial position for the lever 35. At this time the positioning spring establishes a predetermined initial position of the operator arm 29 by forcing the lever 27 against the release bearing 25. However, the force applied by the spring 33 is insufficient to overcome the diaphragm spring 20. Thus, the friction plate 23 remains fully engaged with the flywheel 22 and there is no play between the components of the clutch mechanism 3. With relative positions between the clutch arm 29 and the actuator lever 35 set as described above, the linkage 31 is assembled in the desired position therebetween by insertion of the pins 30 and 34 while adjusting the linkage length with the adjustable turn buckle 32. The temporary pin 36 then is withdrawn from the apertures in the lever 35 and the casing 39 and the components 27, 29, 31 and 35 will produce optimum engagement and disengagement operations of the clutch mechanism 3 by the hydraulic actuator 43.

Obviously, many modifications and variations of the present invention are possible in light of the above teachings. It is to be understood, therefore, that the invention can be practiced otherwise than as specifically described.

What is claimed is:

1. A clutch assembly for automobiles comprising:
   a clutch mechanism;
   a pivotally mounted operator means coupled to said clutch mechanism and pivotable between positions that alternatively produce either engagement or disengagement thereof;
   a pivotally mounted actuator means;
   a coupling means manually adjustable between a first state that couples said operator means to said actuator means and a second state that decouples said operator means from said actuator means;
   a hydraulic driver comprising a piston coupled to said actuator means and operable to produce pivotal movement thereof;
   operator positioning means for establishing a predetermined position of said operator means with said coupling means in said second state and adapted to permit pivotal movement of said operator means from said predetermined position with said coupling in said first state; said operator positioning means comprising bias means biasing said operator means in a clutch disengaging direction with said coupling means in said second state, the bias provided by said bias means being insufficient to move said operator means to a clutch disengaging position; and
   actuator positioning means for establishing a given position of said actuator means relative to said operator means and adapted to permit pivotal movement of said actuator positioning means from said given position, said actuator positioning means being manually adjustable between a first state that establishes said given position and prevents pivotal movement of said actuator means and a second state that allows said hydraulic driver to produce pivotal movement of said actuator means from said given position.

2. An assembly according to claim 1 wherein said operator means comprises an arm having one end pivotally mounted and an opposite end fixed to said coupling means; said actuator means comprises a lever having one end pivotally mounted, an opposite end fixed to said coupling means, and an intermediate portion fixed to said piston; and said coupling means comprises a linkage of manually adjustable length.

3. An assembly according to claim 2 wherein said predetermined position of said arm produces engagement of said clutch mechanism.

4. An assembly according to claim 3 wherein said actuator positioning means comprises a removable pin means for fixing said lever in said given position.

5. An assembly according to claim 4 including frame means and wherein said bias means comprises a spring having one end fixed to said frame means and an opposite end fixed to an intermediate portion of said arm.

6. An assembly according to claim 5 wherein said actuator positioning means further comprises an aperture in said frame means and an aperture in said lever, said apertures being alignable to removably receive said pin.

* * * * *